United States Patent
Regnard et al.

(10) Patent No.: US 10,774,745 B2
(45) Date of Patent: Sep. 15, 2020

(54) SURFACE HEAT EXCHANGER AND ACOUSTIC TREATMENT

(71) Applicant: SAFRAN AIRCRAFT ENGINES, Paris (FR)

(72) Inventors: Josselin David Florian Regnard, Moissy-Cramayel (FR); Laurent Louis Robert Baudoin, Moissy-Cramayel (FR); Hélène Monique Orsi, Moissy-Cramayel (FR)

(73) Assignee: SAFRAN AIRCRAFY ENGINES, Paris (FR)

( * ) Notice: Subject to any disclaimer, the term of this patent is extended or adjusted under 35 U.S.C. 154(b) by 65 days.

(21) Appl. No.: 16/072,069

(22) PCT Filed: Jan. 25, 2017

(86) PCT No.: PCT/FR2017/050152
§ 371 (c)(1),
(2) Date: Jul. 23, 2018

(87) PCT Pub. No.: WO2017/129894
PCT Pub. Date: Aug. 3, 2017

(65) Prior Publication Data
US 2019/0040795 A1    Feb. 7, 2019

(30) Foreign Application Priority Data

Jan. 29, 2016   (FR) ...................... 16 50753

(51) Int. Cl.
*F02C 7/14* (2006.01)
*F02K 1/82* (2006.01)
*F02C 7/045* (2006.01)

(52) U.S. Cl.
CPC ................ *F02C 7/14* (2013.01); *F02C 7/045* (2013.01); *F02K 1/827* (2013.01);
(Continued)

(58) Field of Classification Search
None
See application file for complete search history.

(56) References Cited

U.S. PATENT DOCUMENTS

| 5,797,449 A * | 8/1998 | Oswald | F28D 9/04 165/165 |
| 2008/0095611 A1* | 4/2008 | Storage | F01D 25/125 415/116 |

(Continued)

FOREIGN PATENT DOCUMENTS

| FR | 2 965 251 A1 | 3/2012 |
| WO | 2015/156815 A1 | 10/2015 |

OTHER PUBLICATIONS

Communication dated Oct. 14, 2016 from the French Patent Office counterpart application No. 1650753.
(Continued)

*Primary Examiner* — Michael Lebentritt
(74) *Attorney, Agent, or Firm* — Sughrue Mion, PLLC

(57) ABSTRACT

The invention relates to an assembly for a turbine engine (1), the assembly including: a casing (20) extending along a longitudinal axis (X-X') of the turbine engine (1), a surface heat exchanger (100) arranged along an inner edge (22) of said casing (20) and including a plurality of cooling fins (110) extending radially inwards and longitudinally, and a central body (30) partially concentrically arranged within said casing (20), said casing (20) and the central body (30) defining between one another an annular air channel (Va), the width ($h_{Va}$) of which is substantially constant in the region of the heat exchanger (100). The assembly is characterized in that the fins (110) are distributed over more than 180° of the inner edge (22) of the casing (20) and in that the mean height (($h_{MOY}$) of the fins (110) is more than 5% of the width ($h_{Va}$) of the annular air channel (Va) in the region the heat exchanger (100).

9 Claims, 16 Drawing Sheets

Figure 5:
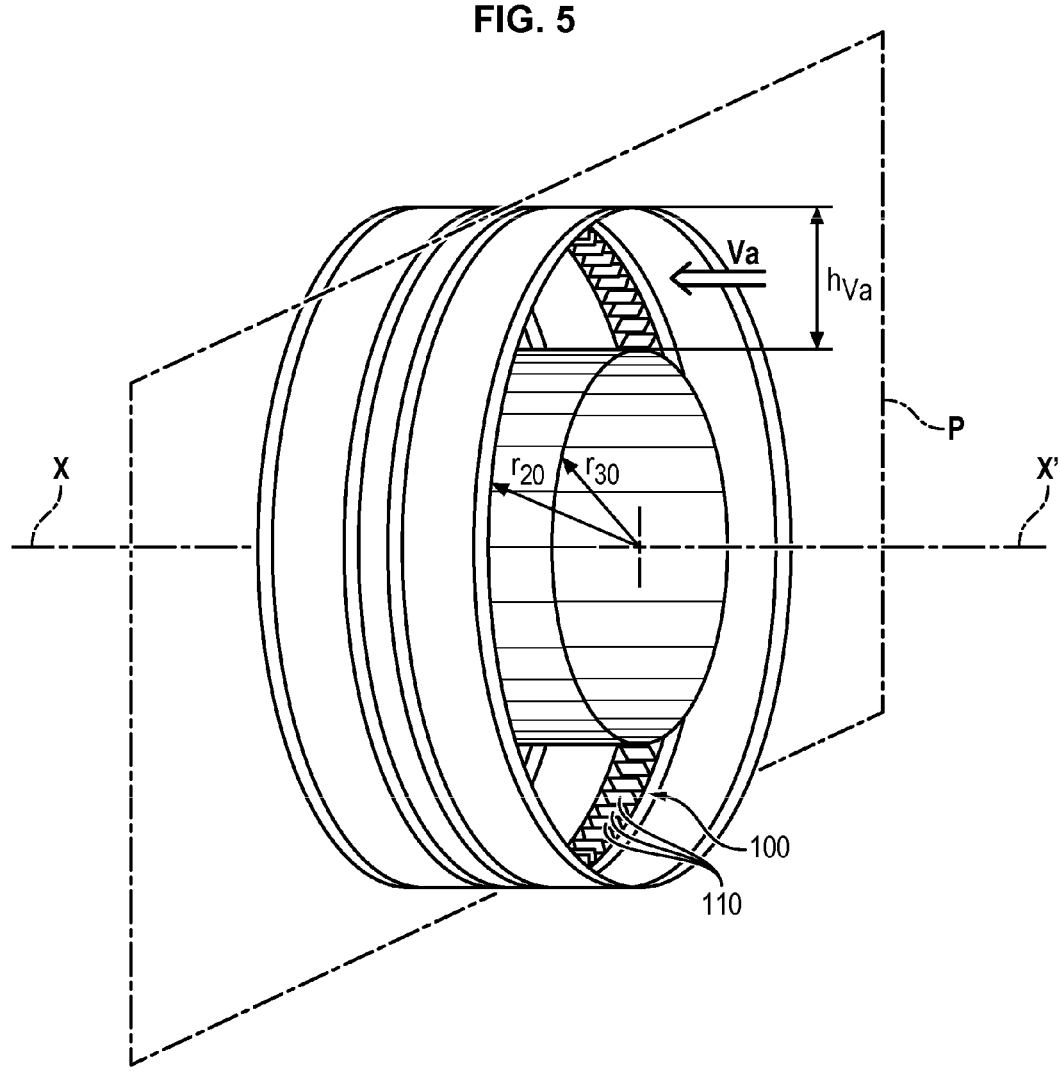

(52) U.S. Cl.
CPC .... *F05D 2240/14* (2013.01); *F05D 2250/184* (2013.01); *F05D 2260/213* (2013.01); *F05D 2260/22141* (2013.01); *F05D 2260/961* (2013.01); *Y02T 50/676* (2013.01)

(56) References Cited

U.S. PATENT DOCUMENTS

| | | | |
|---|---|---|---|
| 2009/0317238 A1* | 12/2009 | Wood | F01D 5/145 415/119 |
| 2011/0146229 A1* | 6/2011 | Bajusz | F28F 9/0075 60/226.1 |
| 2012/0114468 A1 | 5/2012 | Elder | |
| 2014/0027102 A1 | 1/2014 | Antel, Jr. et al. | |
| 2014/0044525 A1* | 2/2014 | Storage | F28F 3/12 415/144 |
| 2015/0000865 A1* | 1/2015 | Ueda | F28F 3/02 165/51 |
| 2017/0184024 A1* | 6/2017 | Sennoun | F01D 9/041 |
| 2017/0184028 A1* | 6/2017 | Sennoun | F02C 7/224 |
| 2017/0292795 A1* | 10/2017 | Waissi | F02C 7/12 |
| 2017/0328279 A1* | 11/2017 | Sennoun | F02C 7/14 |
| 2017/0328280 A1* | 11/2017 | Hussain | F02C 7/141 |
| 2018/0058473 A1* | 3/2018 | Kenworthy | B23P 15/26 |
| 2018/0094583 A1* | 4/2018 | Carretero Benignos | F28D 1/0471 |
| 2018/0281048 A1* | 10/2018 | Yang | B21D 53/06 |
| 2019/0195132 A1* | 6/2019 | Tajiri | F28D 1/0246 |

OTHER PUBLICATIONS

International Search Report of PCT/FR2017/050152 dated May 12, 2017 [PCT/ISA.210].

\* cited by examiner

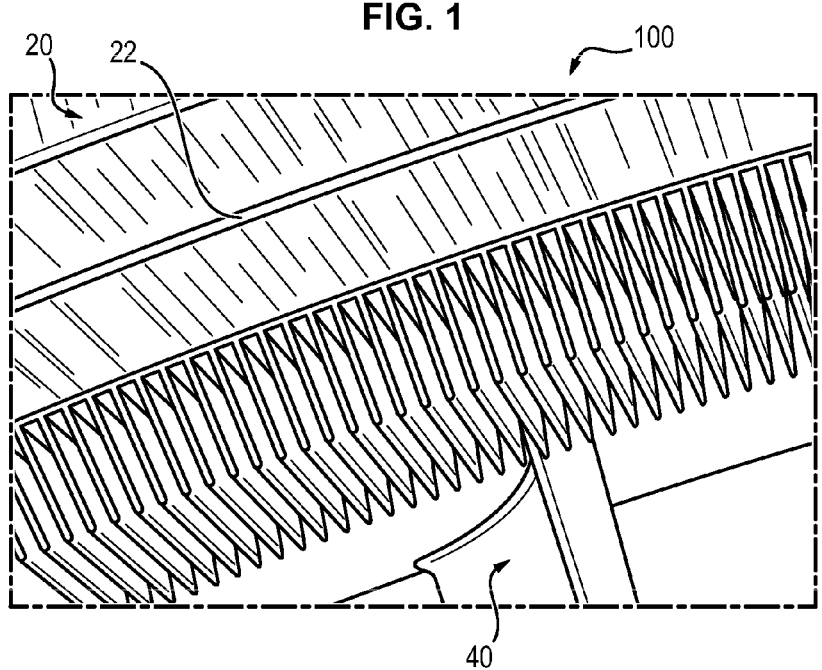
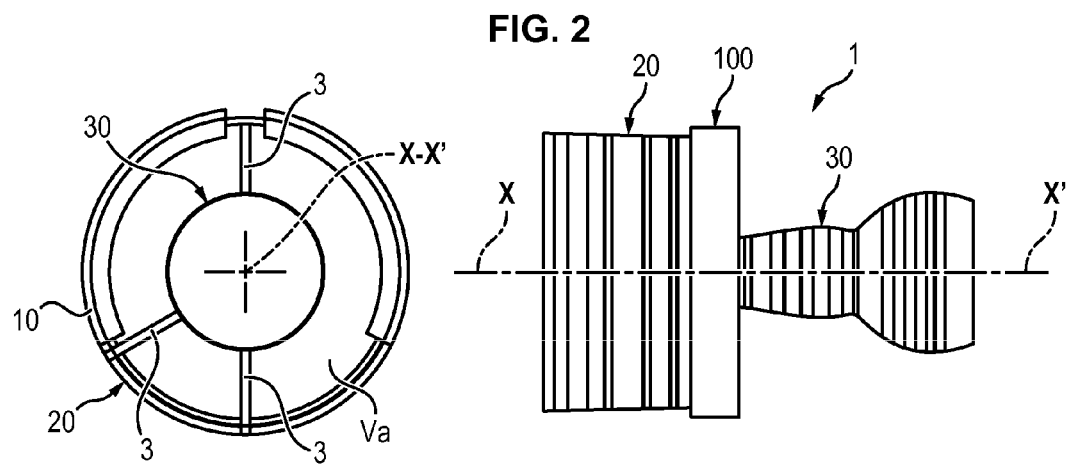

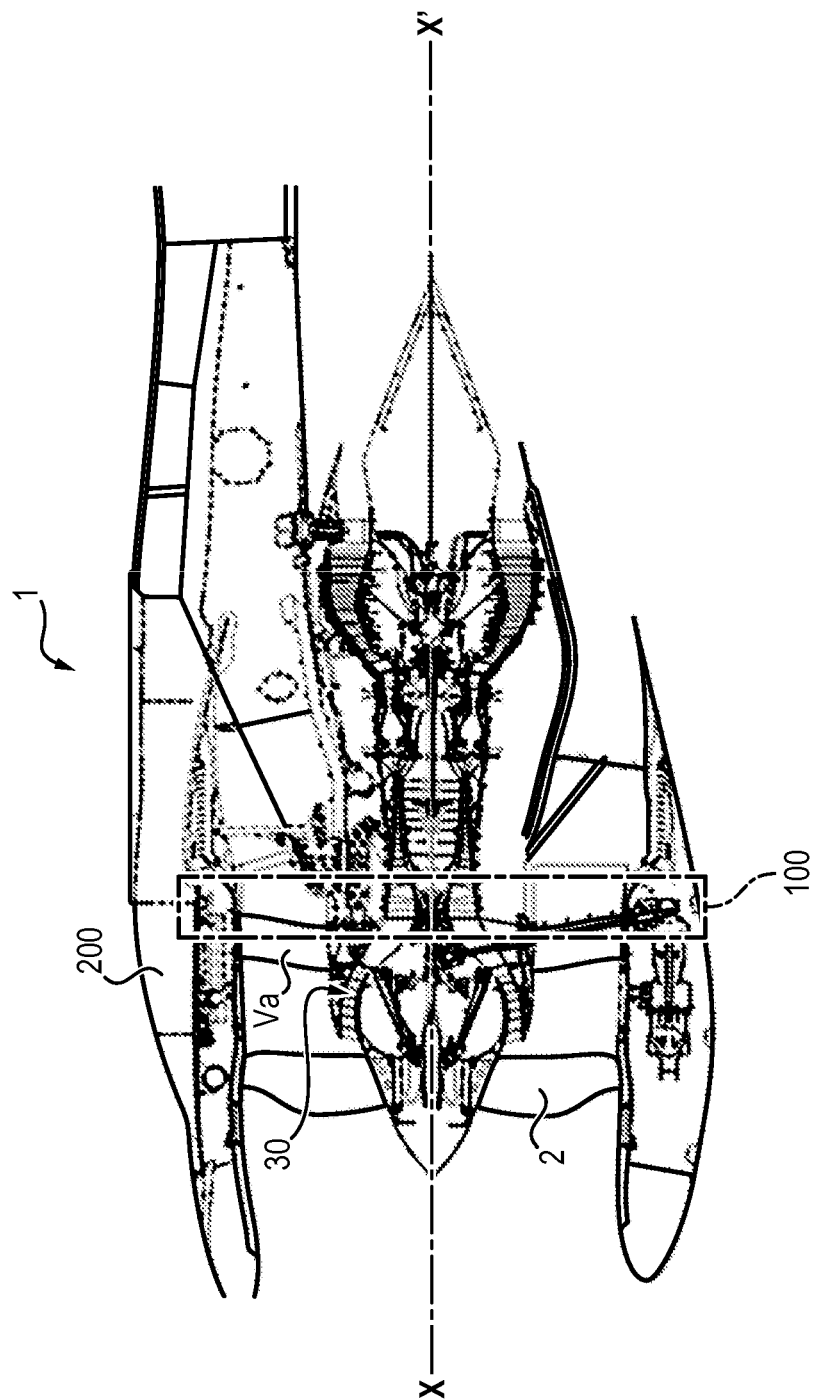

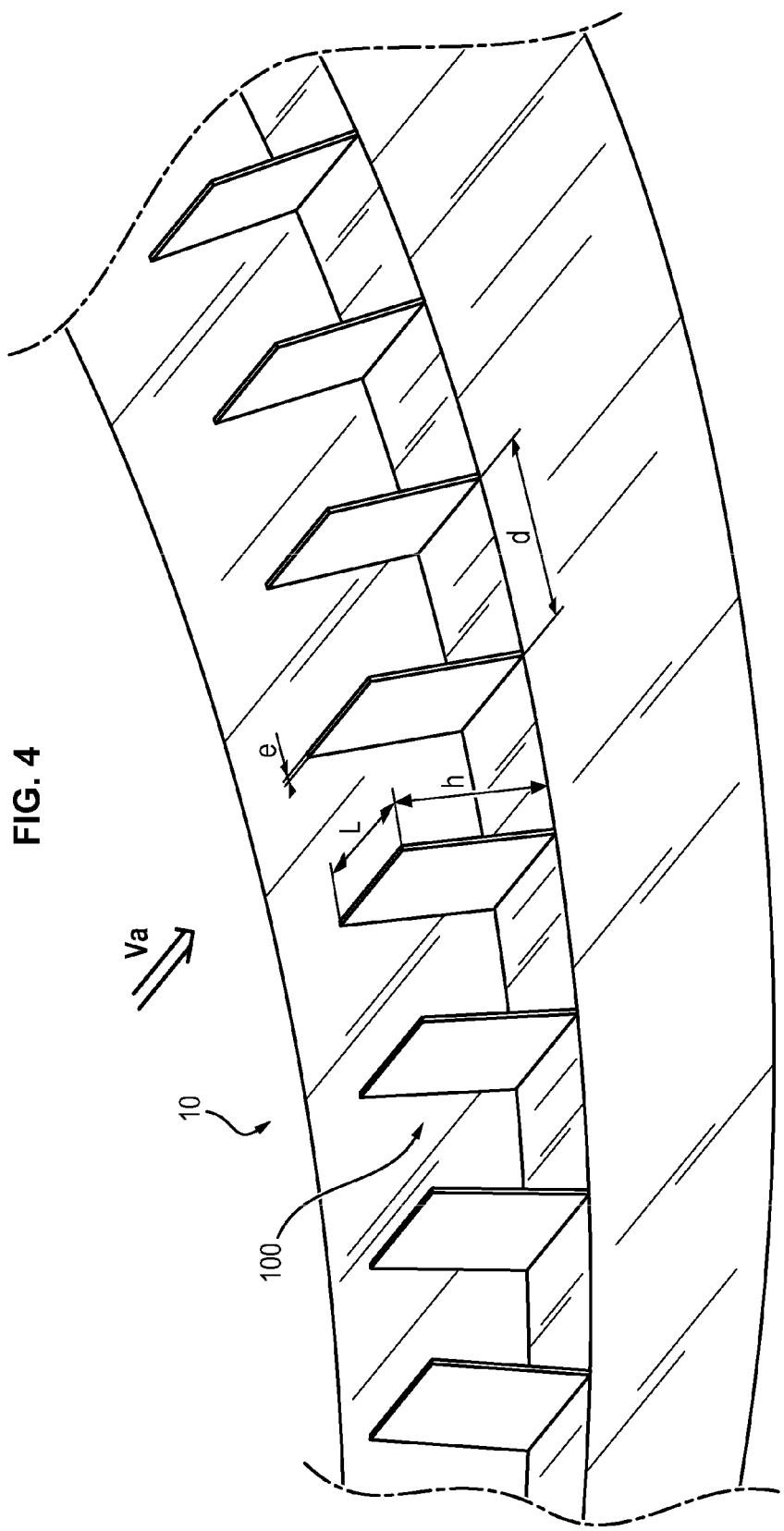

SURFACE HEAT EXCHANGER AND ACOUSTIC TREATMENT

CROSS REFERENCE TO RELATED APPLICATIONS

This application is a National Stage of International Application No. PCT/FR2017/050152, filed Jan. 25, 2017, which claims priority from French Patent Application No. 1650753, filed Jan. 29, 2016, the disclosures of each of which are herein incorporated by reference in their entirety.

GENERAL TECHNICAL FIELD

The invention relates to the architecture of heat exchangers situated on an external fan casing of a turbine engine designed to equip an aircraft.

More precisely, the invention relates to the acoustic treatment of surface air/oil heat exchangers of the SACOC type (surface air cooler oil cooled, see FIG. 1), arranged typically between a fan and outlet guide vanes 40 (OGV, outlet guide vanes), which allow the flow at the outlet of the fan to be straightened.

These exchangers comprise a plurality of fins arranged in the secondary flow of a turbine engine which is thus used to cool the turbine engine.

PRIOR ART

The development of turbine engines, such as the reduction of length of the nacelles, leaves less and less space for the positioning of acoustic treatments, while the noise reduction constraints constantly increase.

Consequently, solutions consisting of disposing acoustic absorption elements downstream of the exchanger are no longer necessarily favored.

Other solutions have attempted to conciliate heat dissipation and noise reduction by modifying the exchangers so as to optimize the volume occupied.

For this reason, documents US 2011/0303398 and US 2011/0126544 have an acoustic layer juxtaposed with the exchanger, the layer typically being in the form of a honeycomb with outgoing pipes using the Helmholz resonant effect.

Document US 2010/0155016, for its part, uses specific materials in the region of the exchanger to reduce sound dispersion.

Finally, document US 2009/317238 proposes to use the fins of the exchanger to reduce the noise emitted by the turbine engine, either by using particular materials, for their porosity for example, or by using their interference property, by generating secondary sources which interfere destructively with a primary source (the determination of distance between two sources is then important).

These solutions have not always obtained results. It is consequently desirable to advance a new architecture which allows ensuring both the functions of cooling and acoustic absorption.

PRESENTATION OF THE INVENTION

To this end, the invention relates to an assembly for a turbine engine, the assembly comprising:
a casing extending along a longitudinal axis of the turbine engine,
a surface heat exchanger arranged on an inner edge of said casing and comprising a plurality of cooling fins extending radially inwards and longitudinally, and
a central body partially concentrically arranged inside said casing,
said casing and the central body defining between one another an annular air channel the width of which at the region of the heat exchanger is substantially constant,
the assembly being characterized in that the fins are distributed over more than 180° of the inner edge of the casing and in that the mean height of the fins is greater than 5% of the width of the annular air channel in the region of the heat exchanger.

The invention can comprise the following characteristics, taken alone or in combination:
- the distribution of the fins on the inner edge of the casing is distributed discontinuously,
- the height of the fins is constant,
- the height between fins is variable,
- the height of the fins depends on their angular position and satisfies a sinusoidal function,
- the equation is the following: $h(\theta)=h_0| \cos(n\cdot\theta)|$, with n a natural integer and $h_0$ such that $h_0 \geq \pi/2 \times 0.05 \times h_{Va}$, $h_{va}$ being the width of the air channel $V_a$,
- the fins are distributed over more than 270° of the inner edge of the casing,
- the spacing between two fins is less than 8.5 mm, so that the exchanger behaves acoustically like an expansion chamber for frequencies extending up to 10 kHz, at an ambient temperature of 20° C.,
- the spacing between two fins is less than 4.3 mm, so that the exchanger behaves acoustically like an expansion chamber for frequencies extending up to 20 kHz, at an ambient temperature of 20° C.,
- the spacing between two fins is determined at constant surface area depending on the surface area of a fin and the desired total surface area of the fins.

Finally, the invention relates to a turbine engine comprising an assembly as described previously.

PRESENTATION OF THE FIGURES

Figure 12:
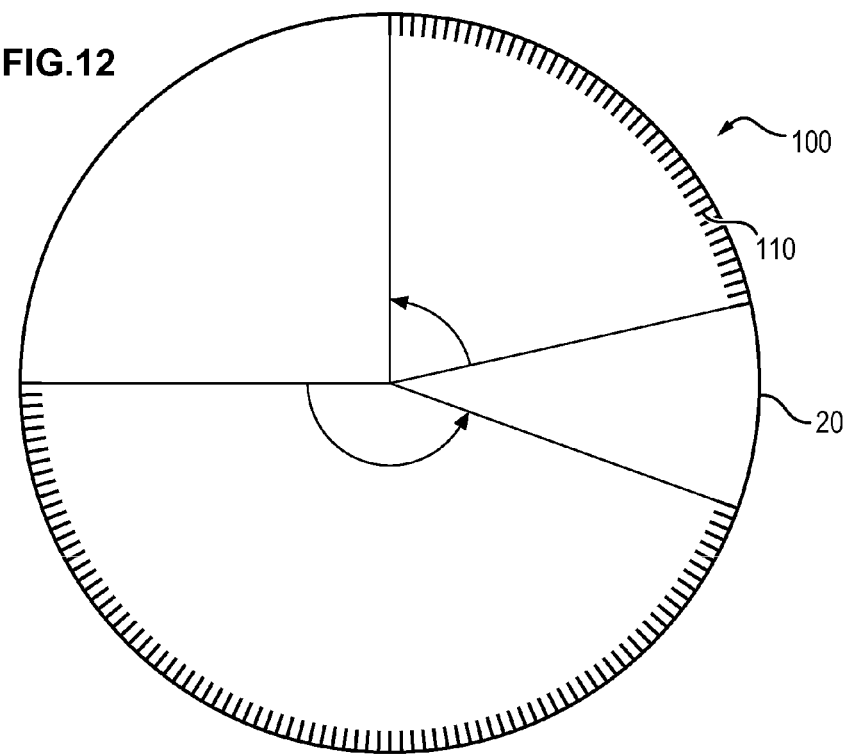
Figure 13:
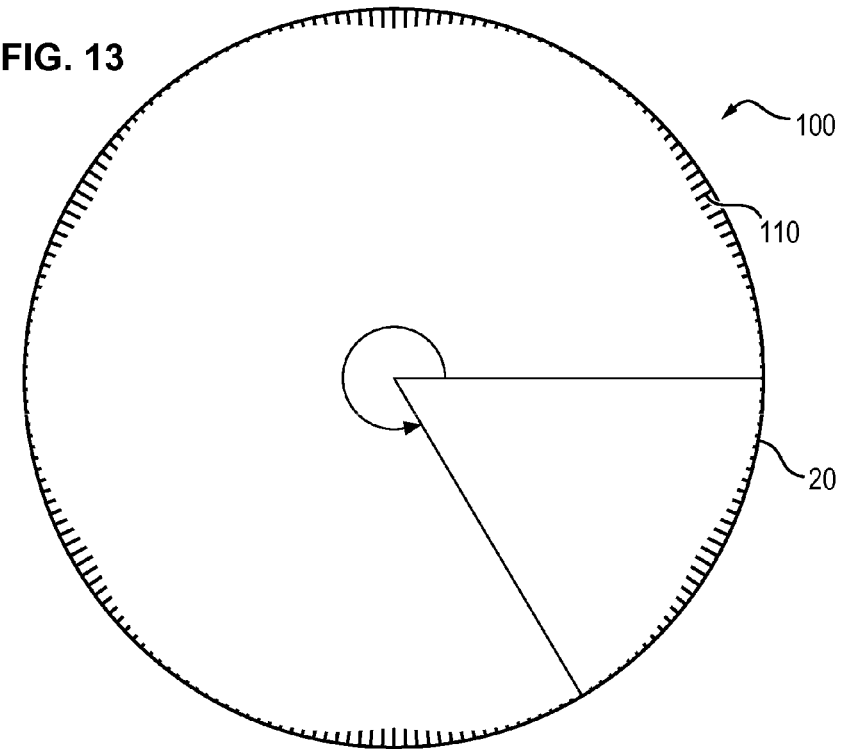
Figure 14:
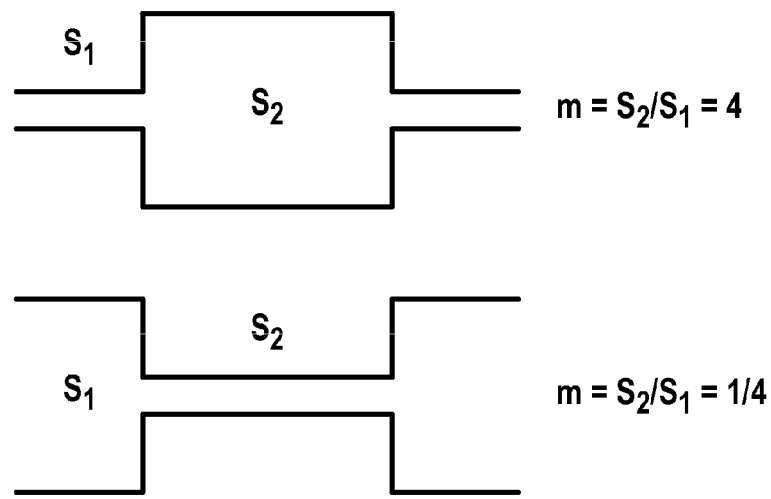
Figure 15:
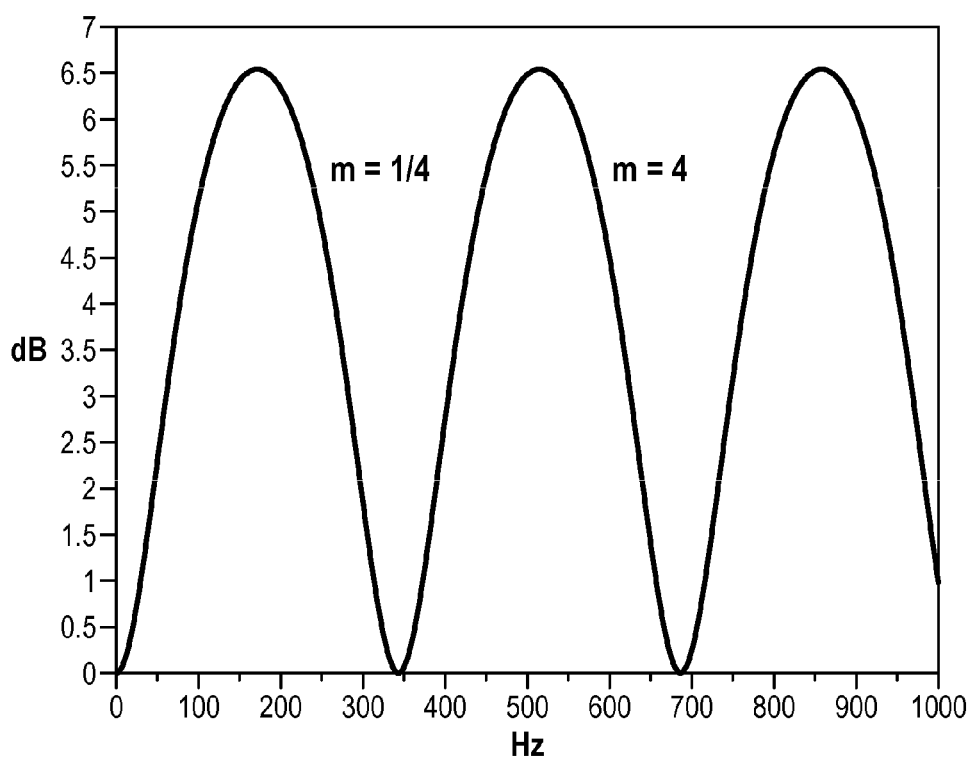
Figure 16:
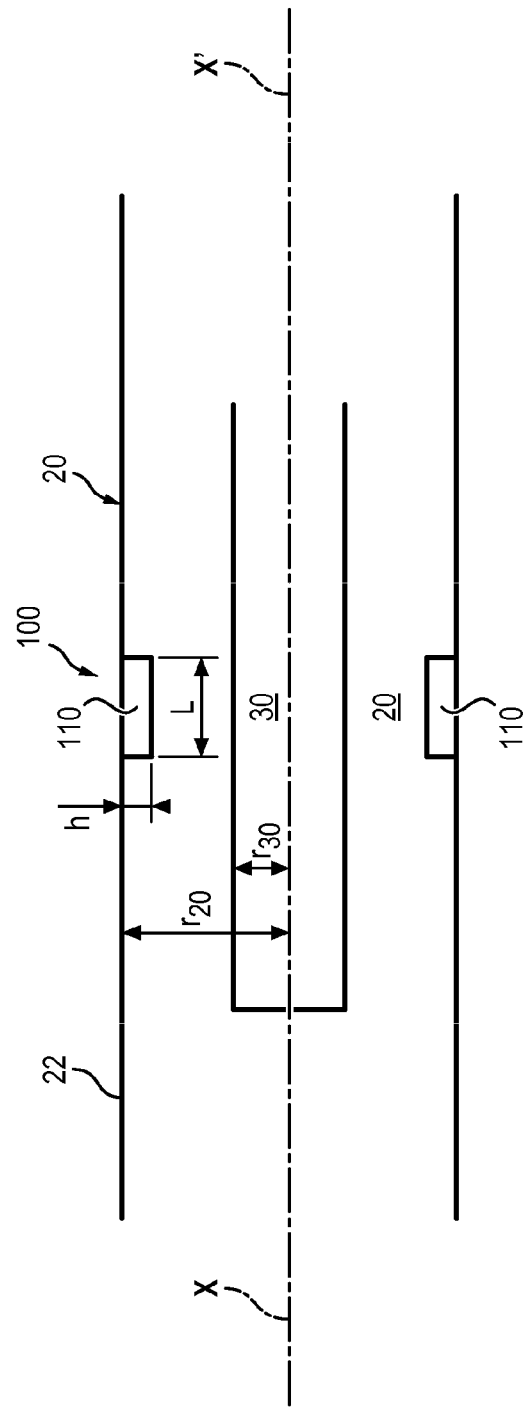
Figure 17:
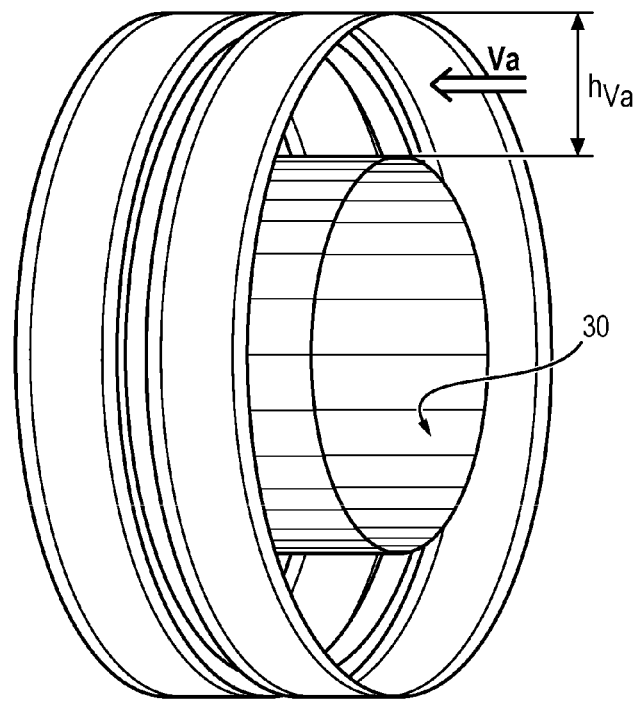
Figure 18:
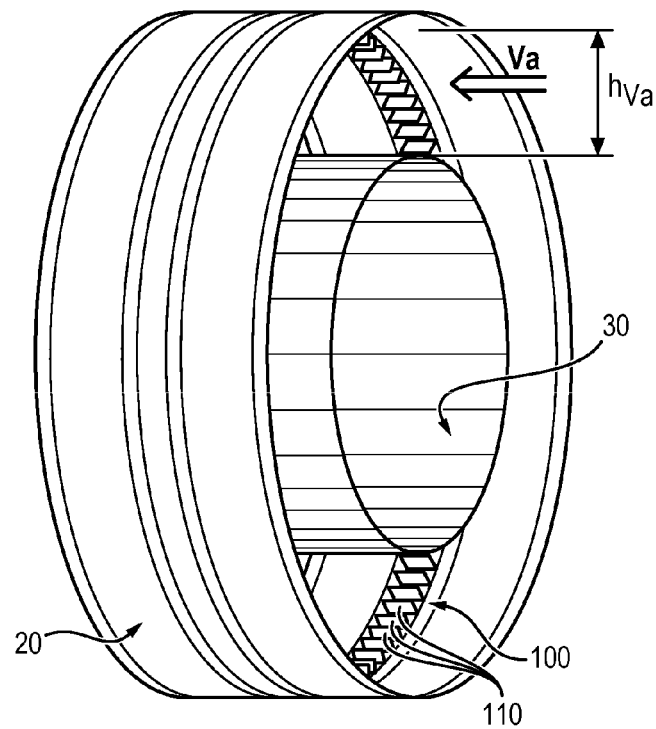
Figure 19:
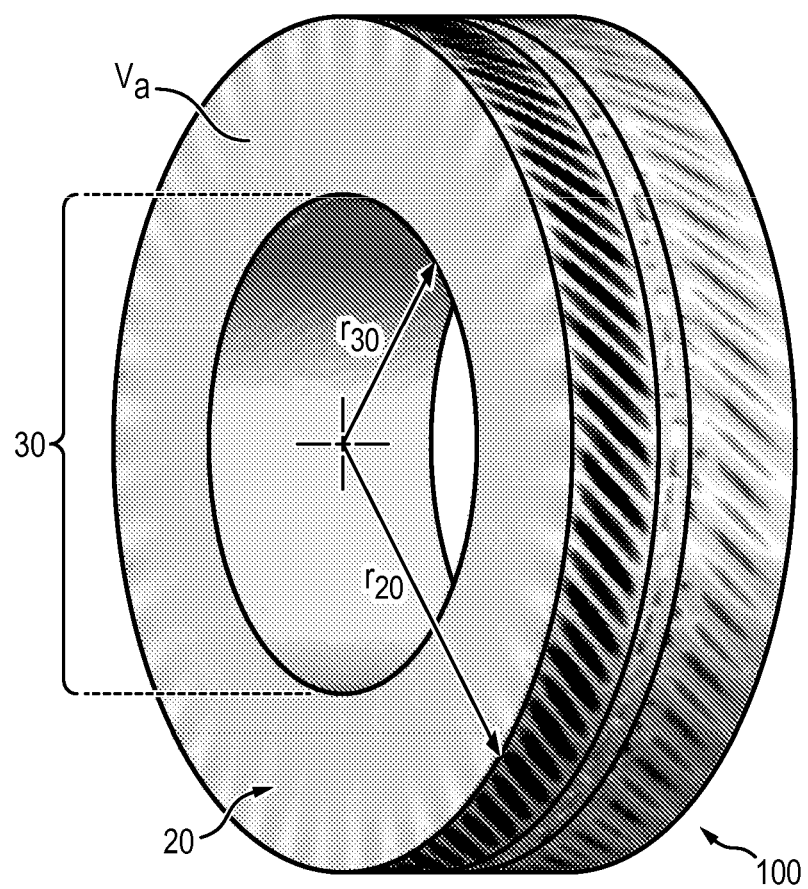
Figure 20:
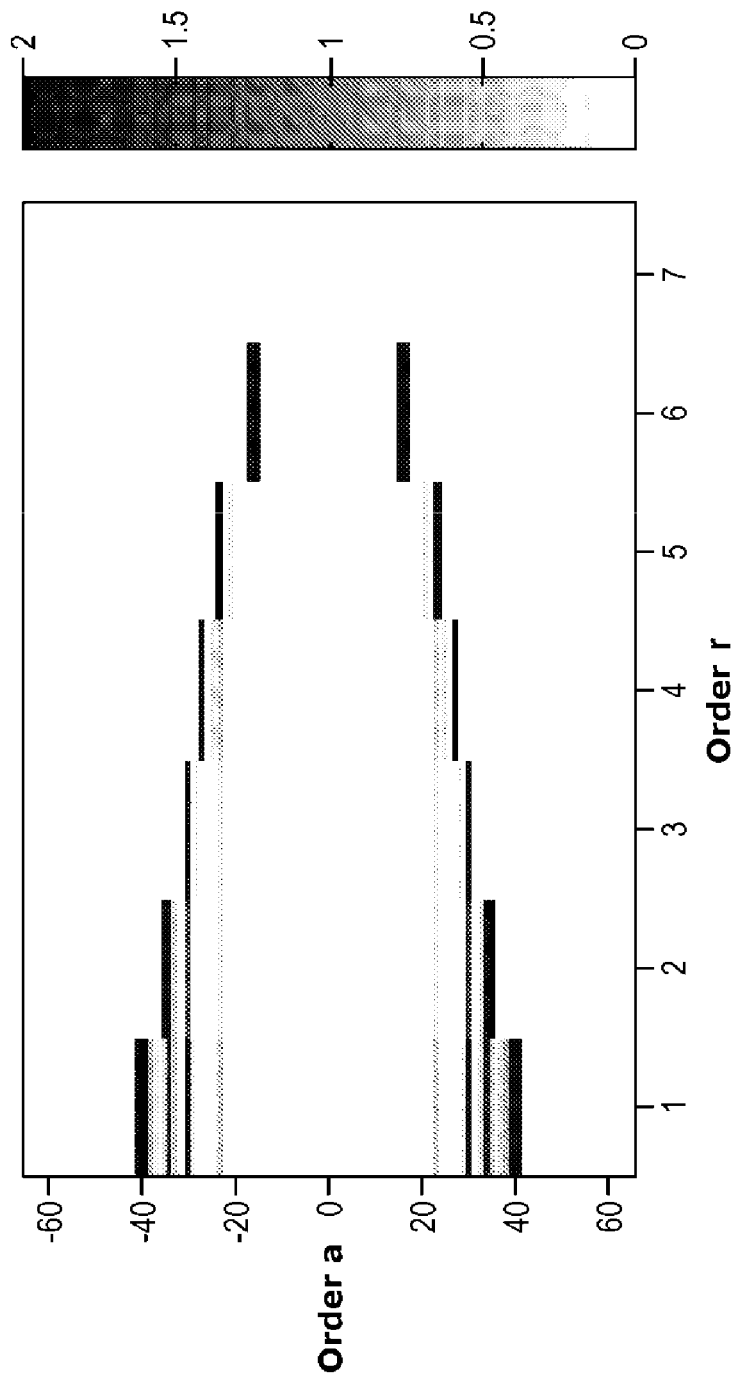
Figure 21:
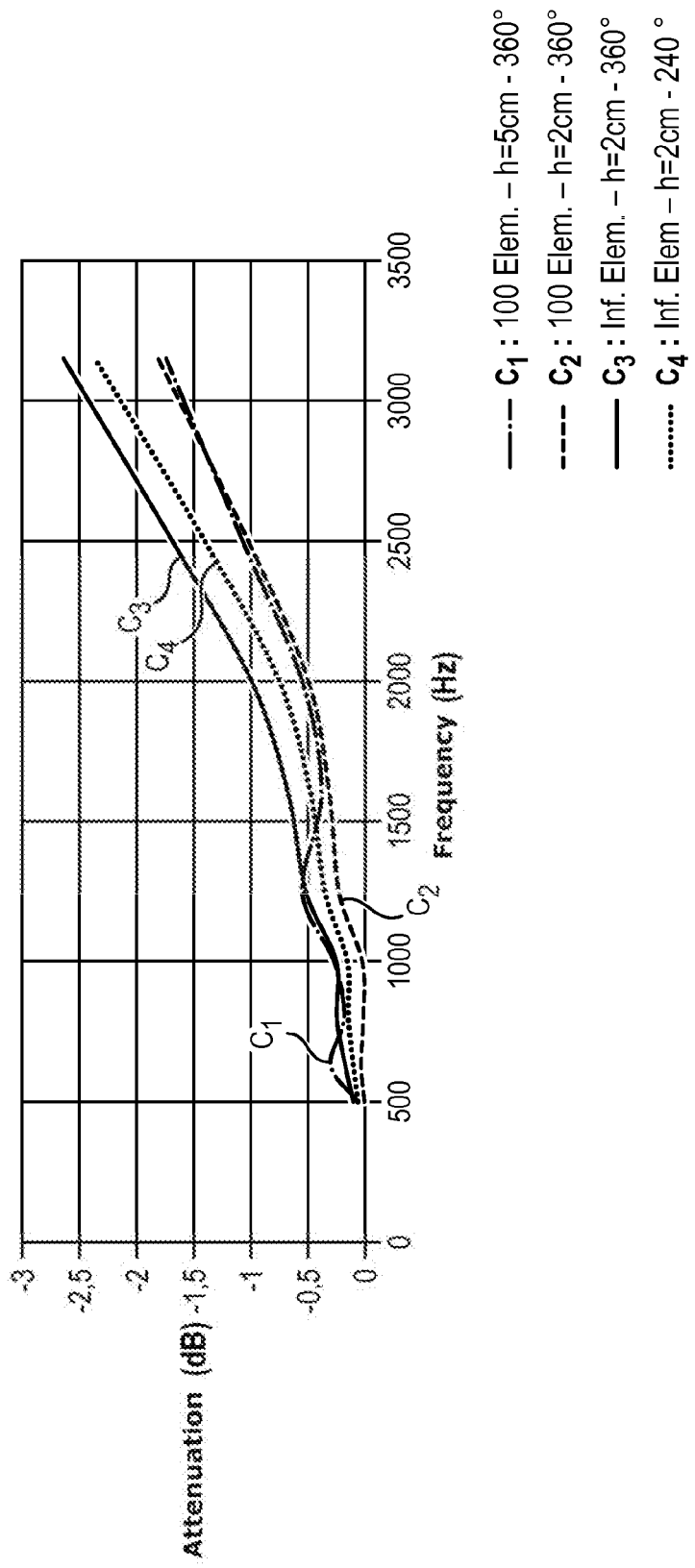

Other features, aims and advantages of the invention will be revealed from the description that follows, which is purely illustrative and not limiting, and which must be read with reference to the appended drawings, in which:

FIG. 1 shows a view of the fins of a SACOC type exchanger as known from the prior art, FIG. 2 shows the positioning of an exchanger in a turbine engine, FIG. 3 shows a turbine engine, FIGS. 4 and 5 shows an exchanger and its geometric features according to one embodiment of the invention, FIGS. 6 to 13 show different embodiments of the invention, FIG. 14 shows two schematics of the expansion chamber, FIG. 15 shows losses by transmission in a transmission chamber, FIG. 16 shows the expansion chamber created by the fins of the exchanger, FIG. 17 shows an infinite number of fins, thus creating a perfect expansion chamber, FIG. 18 shows a finite number of fins, FIG. 19 shows a model of acoustic propagation, FIG. 20 shows a mode attenuation diagram, FIG. 21 shows a curve illustrating the influence of different parameters, FIGS. 22a, 22b and 23a, 23b show two examples of mode attenuation diagrams as a function of two fin distribution densities.

DETAILED DESCRIPTION

FIGS. 2 and 3 show the positioning of a surface exchanger 100 in a turbine engine 1.

The turbine engine 1 receives at the inlet, from a fan 2, air divided into two flows, a primary flow and a secondary flow.

The primary flow is compressed, then ignited by means of fuel. The gases generated drive a turbine which drives the fan in rotation. This drives the secondary flow which creates the thrust.

The turbine engine 1 is housed in a nacelle 200 comprising a casing 20 extending along a longitudinal axis X-X' of the turbine engine 100. The turbine engine comprises, at least partially downstream of the fan, following the direction of the air flow passing through the turbine engine, a central body 30. The central body 30 is located partially inside this casing 20. The central body 30 is arranged concentrically or substantially concentrically with respect to the longitudinal axis X-X'. The central body 30 combines in particular the different elements which the primary flow passes through.

The casing 20 and the central body 30 define between one another an annular air channel Va, in the form of an annular channel, allowing the secondary flow to pass. In a plane orthogonal to the longitudinal axis X-X, the annular air channel Va has the shape of a regular ring.

A surface heat exchanger 100 is arranged on an inner edge 22 of the casing 20. The exchanger 100 comprises a plurality of cooling fins 110 which extend both radially toward the interior of the casing 20, in the direction of the central body 30, and also longitudinally along the axis X-X'.

The heat exchanger is called "surface" type because the exchange takes place thanks to the surface of the fin 110, between the fluid which circulates in the fins 110 and the air of the secondary flow which passes in the annular air channel Va.

Typically, such a heat exchanger 100 operates on an oil-air exchange principle, commonly called SACOC.

The thermal properties of the SACOC thus depend mainly on the total surface area of the fins 110 which compose the exchanger 100.

Depending on the embodiments, the fins 110 have the shape of rectangular parallelepipeds, on which can be defined a thickness e, a length L and a height h. The height h and the length L being much larger than the thickness e, the contact surface area is primarily due to surface area, hence the term surface exchanger (see FIG. 4).

Conventionally, the thickness e is 1 to 2 mm and the length L 110 m. Thermally and aerodynamically, it is preferably to have a small thickness e to favor heat exchange and to obstruct as little as possible the secondary flow. The length L, for its part, is a purely aero-thermodynamic criterion and intervenes little in acoustics (low sensitivity as regards acoustics).

In the region of the heat exchanger 100, that is in the region of an orthogonal plane P orthogonal to the longitudinal axis X-X' which intersects said exchanger 100, the width, or cross-section, of the air channel Va is constant or substantially constant (see FIG. 5).

In other words, the cross section in such a plane of the casing 20 and of the central body 30 forms two concentric circles, with respective radii $r_{20}$ and $r_{30}$. The width of the air channel Va, which corresponds to the thickness of the ring or to the radial distance between the casing 20 and the central body 30, that is the difference between the two radii $r_{20}$ and $r_{30}$, is therefore constant (see FIG. 5).

The previously defined width is denoted $h_{Va}$.

In a particular embodiment, it is possible that the cross-sections in the plane P do not form circles, or at least not concentric circles. The width $h_{Va}$ then designates the mean radial distance between the casing 20 and the central body 30.

The terms upstream and downstream are defined by the air flow direction in the air channel when the turbine engine 1 is in operation.

For reasons of clarity in the description, the phenomena and physical principles contributing to the feasibility and to the operation of the invention are explained in annexes at the end of the present description.

In order to improve the acoustic properties of the turbine engine 1, the fins 110 are distributed over more than 180° of the inner edge 22 of the casing 20 and the mean $h_{MOY}$ of the fins 110 is greater than 5% of the width of the annular air channel in the region of the heat exchanger $h_{Va}$, $h_{MOY} \geq 0.05 \, h_{Va}$), i.e. in the plane P.

The term mean height signifies that the mean of the height h of the fins is effected. When a zone has no fins 110, a zero height is not assigned to it. This signifies that the mean height $h_{MOY}$ is calculated only for the zone comprising fins 110.

This value of 5% of the air channel Va allows the physical principles of acoustics detailed in the annexes to be taken advantage of while still maintaining the useful exchange surface for thermal dissipation.

The value of 180° is also linked to obtaining a minimum benefit as regards noise reduction.

Several embodiments will now be described. In fact, there exist several adjustment levers: the height h of the fins 110, the distribution of the fins 110 on the inner edge 22 of the casing 20 and the distance d between the fins 110. The latter parameter can nevertheless be determined by calculation based on equal thermal performance (iso-surface) with respect to an exchanger 100 conventionally installed in a turbine engine 1 or with respect to specifications previously established. In this case, it is adjusted a posteriori to allow the necessary heat exchange surface are to be obtained, while still remaining in sufficient number to satisfy the physical effects presented in the annexes.

The height h of the fins 110 can satisfy the condition previously introduced in several manners.

Figure 6:
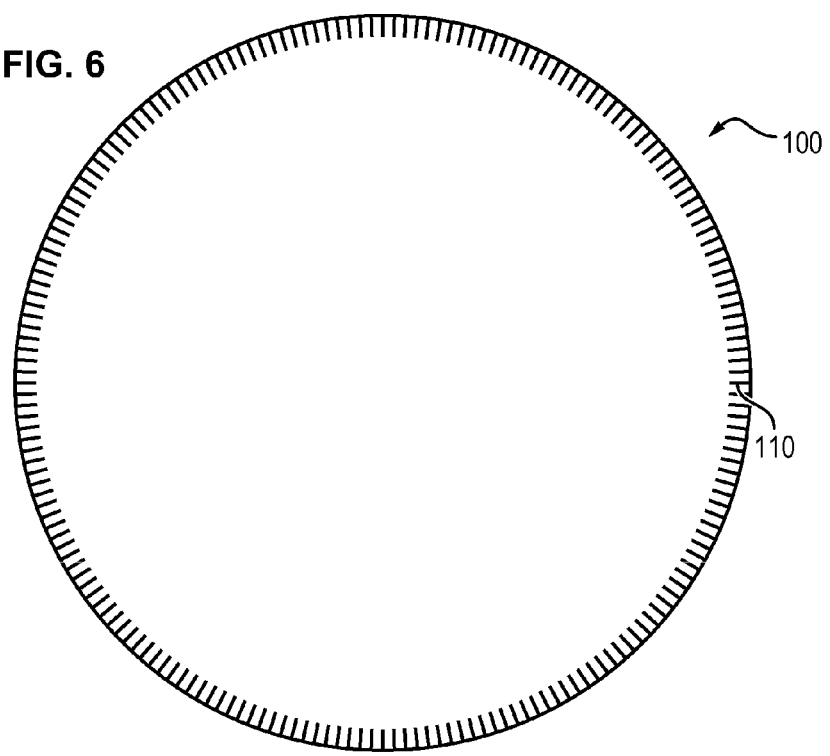
Figure 7:
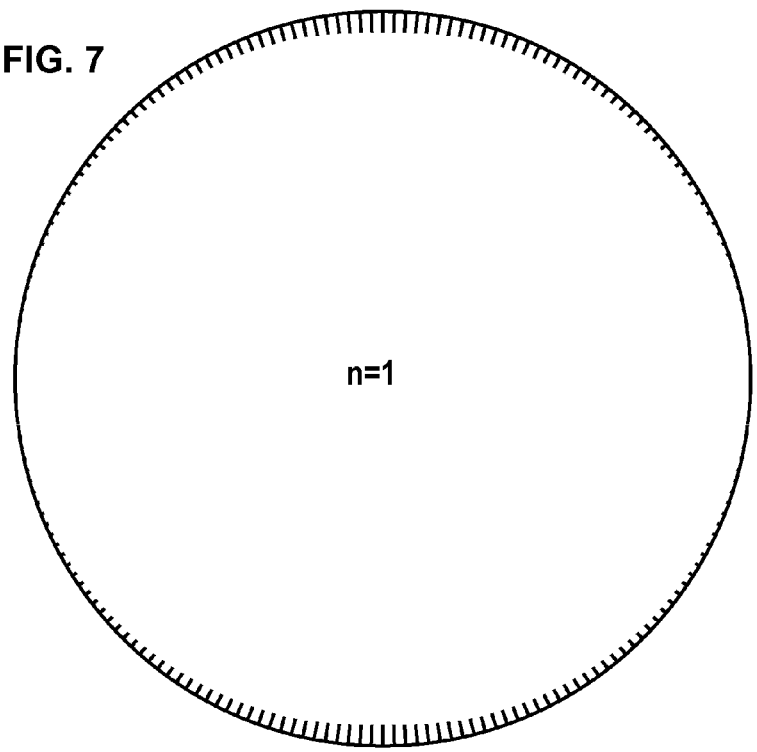
Figure 8:
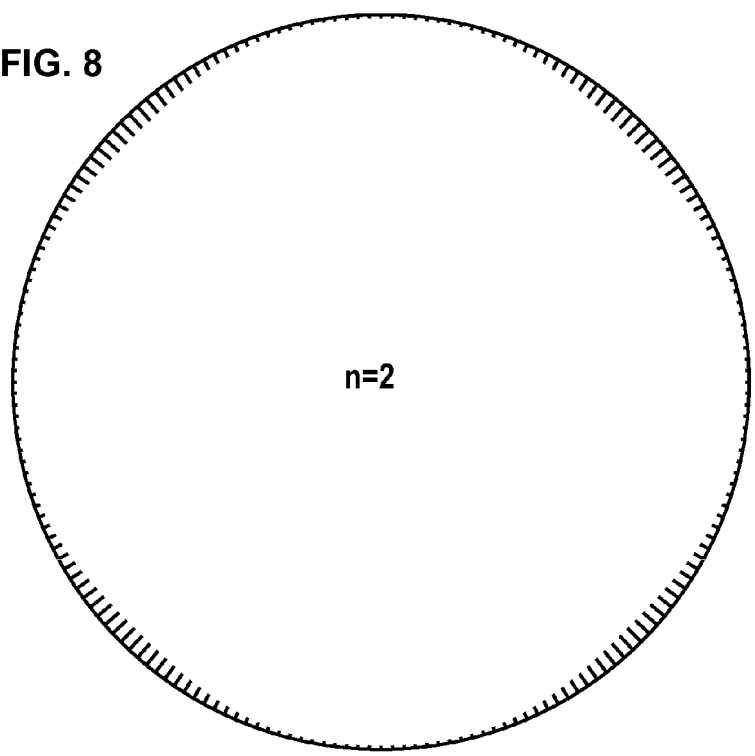
Figure 9:
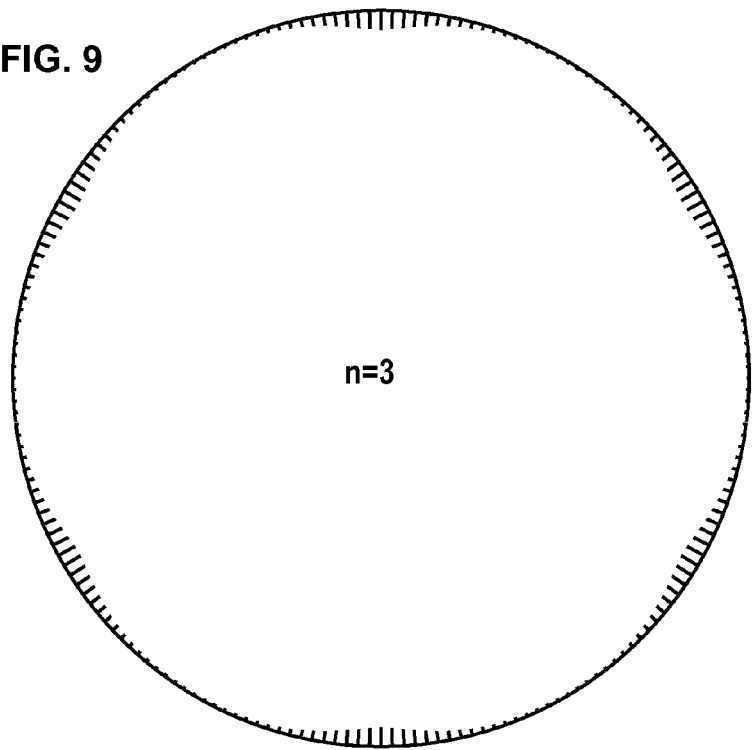
Figure 10:
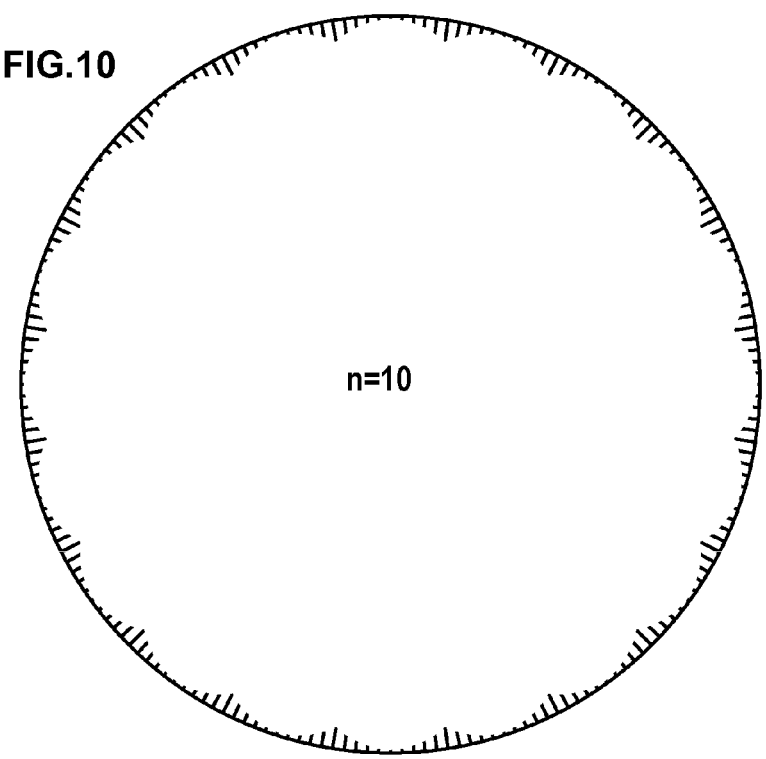

In connection with FIG. 6, the first embodiment consists of having a constant height h of the fins 10: we thus have $h = h_{MOY} \geq 0.05 \, h_{Va}$ [1000]. By way of an example, for an air channel Va with a width $h_{va}$ of 40 cm, the height h must be greater than 20 mm.

Alternatively, the height h of the fins 110 can be variable. More particularly, it is defined as a function of the angular position of the fins 110 on the inner edge 22 of the casing 20.

The height h is then defined as a function of the type $h = h(\theta)$.

The parametric function called "marguerite" can be cited:

$$h_r(\theta) = h_0 |\cos(n\theta)|$$

with n a natural integer and $h_0$ such that $h_0 \geq \pi/2 \times 0.05 \, h_{Va}$, i.e. $h_0 \geq 0.08 \, h_{Va}$, so that $h_{MOY}$ always satisfies the inequality [1000] previously introduced.

FIGS. 7, 8, 9 and 10 show the preceding parametric height with n respectively n=1; n=2; n=3; n=10.

The parameter n is adjusted depending on the modal forms which propagate in the air channel Va.

Other sinusoidal functions can also be cited, of the type:

$$h_n(\theta) = h_0(1+\cos(n\theta))$$

with $h_0 \geq 0.05\, h_{Va}$,
or even $$h_n(\theta) = h_0 \cos^2(n\theta)$$

with $h_0 \geq 0.10\, h_{Va}$.

More generally, a function of the sinusoidal type can be applied, while insuring that the mean height $h_{MOY}$ of the fins 110 satisfies the condition.

The distribution of the fins 110, for its part, can also vary depending on the embodiments.

If the 360° distribution seems most natural, it is not always implementable because the entire edge 22 of the casing 20 is not necessarily available for installing the fins 110 of the exchanger 100, in particular due to the passage of cables, structural attachment arms or the passage of utilities, pylons, etc.: these elements shown by reference 3 in FIG. 2.

In one embodiment, the distribution is greater than 270°. See in particular FIG. 11 in which the distribution is equal to 270°.

Figure 11:
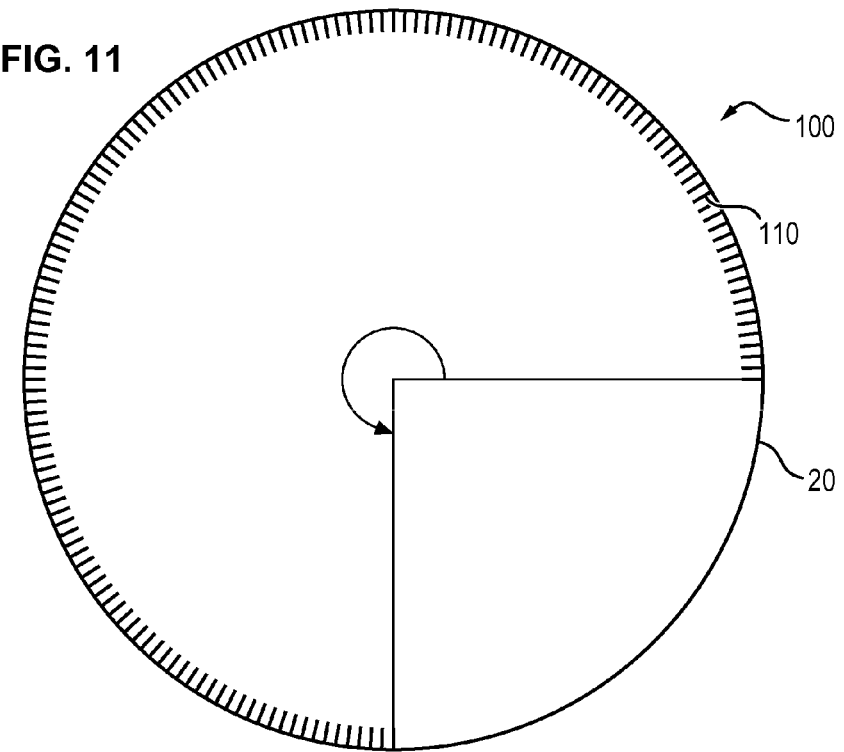

In this embodiment, the distribution is continuous, i.e. the assembly of fins forms a single angle greater than 180° (see also FIG. 11).

Alternatively, the distribution can be distribution, that is with interruptions in the distribution on the inner edge 22, as shown in FIGS. 12 and 13. By summing the angles covered by the fins 110, it is nevertheless required to satisfy the 180° condition, which is therefore an accumulated angle condition.

The criteria of height h and of distribution are combinable and all the combinations satisfying both criteria, $h_{MOY} \geq 0.05\, h_{Va}$ and more than 180° of distribution, can be considered.

FIG. 13 thus illustrates a continuous distribution greater than 270°, with a parametric height as a sinusoidal function.

The different embodiments thus allow the passage of utility (cables, utilities) or structural arms (casing arms, pylons on the casing 20) which are shown by reference 3 on FIG. 2.

For example, it is possible that these elements 3 pass longitudinally through the exchanger 100 by passing where the height of the fins 110 is zero, due to the sinusoidal function, or where a discontinuity is present.

In relation to the annexes present in the end of the description, the values of 5% of the height $h_{Va}$ of the air channel Va are selected so that the acoustic effects are perceptible. The same is true of the 180° distribution of the fins 110; below that, it is felt that the desired effects are not sufficient.

Finally it is possible to modify the distance d between the fins 110. Typically, this parameter can be adjusted once the height h and the distribution of the fins 100 to obtain the surface area required for heat exchange are known. In other words, it is determined as a function of the surface area of a fin 110 and of the desired total surface area of the fins 110.

It is thus considered that the distance d is determined by the constant surface area with respect to the constraints of thermal dissipation, generally supplied by a specification.

One consequence linked to the new height h of the fins 110, which is greater than in a standard exchanger, resides in the possibility of a slightly greater spacing the fins 110, with a total equivalent heat exchange surface.

Another possibility consists of selecting the inter-fin distance d to ensure a good acoustic reflection effect as disclosed in the annexes. In order for the exchanger 100 to act as an expansion chamber as disclosed in the annexes, it is necessary that the wavelength A of the sound be four times greater than the inter-fin 110 distance d.

For example, to take advantage of the reflection effect up to 10 kHz, respectively 20 kHz, under normal temperature conditions on the order of 20° C., the inter-fin distance d must be less than 8.5 mm, respectively 4.3 mm.

This distance criterion d as a function of the wavelength assigned to the frequency of the noise that it is desired to attenuate can however be redundant with the distance d calculated based on constant surface area. Whatever is the case, the aim is to determine a distance d which satisfies both dimensioning for thermal effects and for acoustic effects.

Finally, the shape of the fins 110, which have been presented as rectangular parallelepipeds, can be optimized to improve their aerodynamics ("best aero" criteria). The height h mentioned in the present description will either be the mean height of each fin, or the maximum height.

Thus, the invention proposes a solution for acoustically treating a turbine engine by resorting to the geometry of the fins of the exchanger. Just as it is ensured that the total surface area of the fins 110 remains equal to that of a conventional exchanger, or at least sufficient to allow heat exchange, the exchanger advantageously combines its functions of thermal dispersion and of acoustic treatment, hence a space saving inside the turbine engine.

Moreover, as it relies only on geometric considerations, the invention is not linked to a particular type of material.

Annex 1: Acoustic Reflection on the Exchanger 100

The first physical principle allowing the operation of the invention resides in the optimization of the reflection coefficient in the duct via the modification of the apparent cross section.

FIG. 14 has two illustrating schematics.

For a planar propagation mode, i.e. below the cutoff frequency, the loss in transmission ("TL" for transmission loss) is expressed as a function of the wavenumber k ($k = 2\pi f/c$, where c is the speed of sound in the medium), of the length L of the cross section change and of the aspect ratio m: $m = S_2/S_1$.

The loss in transmission is written in the form:

$$TL = 10\log_{10}\left[1 + \frac{1}{4}\left(m - \frac{1}{m}\right)^2 \sin^2(kL)\right] \quad [1001]$$

Due to the symmetry of the expression [1001] between m and 1/m, it is noted that it matters little whether the apparent cross section shrinks or is enlarged: the transmission loss curve presented in FIG. 15 is the same.

In the present case of the exchanger 100, the expansion ratio m is less than 1, i.e. this is a shrinkage of the cross section.

From an acoustic point of view, if the wavelength of the sound wave is sufficiently large with respect to the inter-fin distance d of the exchanger 100, the presence of the fins 110 modifies the apparent cross-section, as shown in FIG. 16, and the exchanger 100 behaves like an expansion chamber: the geometry of FIG. 17, including an infinite number of fins, and that of FIG. 18, including a finite but sufficient number of fins, have similar results as regards acoustics.

Nevertheless, propagation being multimodal, that is also occurring above the first cutoff frequency of the air channel Va, propagation not occurring only in a planar mode, but in radial r and azimuthal a modes. For these modes, the curve shown in FIG. 15 does not apply.

Distinguished in the secondary stream (here therefore the air channel Va) are two types of noise, in a double flow turbine engine 1:

line noise, linked to a periodicity, produced by the interaction of the turbine blades, the outlet guide vanes 40 (OGV) or the inlet guide vanes (IGV), wideband noise (BLB), of random origin, resulting from the noise of turbulence on the leading edges, the trailing edges of the fan 2 . . . .

In the case of wideband noise, the maximum amplitude of the acoustic energy is deployed in high-order azimuthal modes on the external edge 22 of the casing 20: any element reflecting or refracting in this zone will have an optimal influence on the propagation of the noise. It is for this reason that the exchanger 100 is of great importance for the reduction of wideband noise.

By numerical calculation shown in FIG. 19 which shows a model of the acoustic propagation of a high-order azimuthal mode, for example for r=1 and a=40, in the air channel Va, a reflection of the acoustic energy is observed downstream of the exchanger 100, which reduces the external radiation. In FIG. 19, the lighter the color, the weaker the sound amplitude.

As shown in FIG. 20, by simulating the calculation on more radial, shown by r in the abscissa, and azimuthal modes, shown by the order a in the ordinate, the strong attenuation of the azimuthal modes of high order a is confirmed, in positive or in negative. The color represents the transmission losses PL (the darker the color, the greater the attenuation).

FIG. 21 shows a set of curves illustrating the effects of the height h of the fins, of the number of fins as well as the distribution on the edge of the casing:

Curve C relates to a hundred fins of height h=5 cm distributed over 360°,

Curve $C_2$ relates to a hundred fins of height h=2 cm distributed over 360° C., Curve $C_3$ relates to an infinite number of fins, which is equivalent to a perfect expansion chamber as shown in FIG. 17, of height h=2 cm distributed over 360°, Curve $C_4$ relates to an infinite number of fins of height 2 cm distributed over 240°.

It is noted that the number of fins and the positioning influence the transmission loss TL of expression [1001] at high frequencies, in particular greater than 1 kHz, while the height h of the fins has more control on attenuation at low frequency.

Annex 2: modal redistribution by the exchanger 100

The second physical phenomenon contributing to the operation of the invention is a model redistribution effect in the presence of a rotor-stator system. Refer to Tyler & Sofrin whose model allows an estimate of the modes which in theory cannot propagate—this is called modal cutoff. For a rotor-stator system, these cutoffs are controlled by the number of blades of the fan and the number of stators.

This modal redistribution depends to a great deal on the number of fins 110 of the exchanger 100 on the inner edge 22 of the casing 20. It is possible to determine this number so as to deploy the acoustic energy toward modes which are not propagated in the air channel Va.

FIGS. 22a, 22b and 23a, 23b show amplitude diagrams of modes at the outlet of the air channel Va for a radial r=1 and azimuthal order a=18, for a height h of the fins 110 of 5 mm and a distribution over 360°. Taking as an example a fan composed of 18 blades: at the fundamental line 1F, the spatial distribution of the acoustic energy imposes that the mode 18 propagates most of the acoustic energy.

Figure 22A:
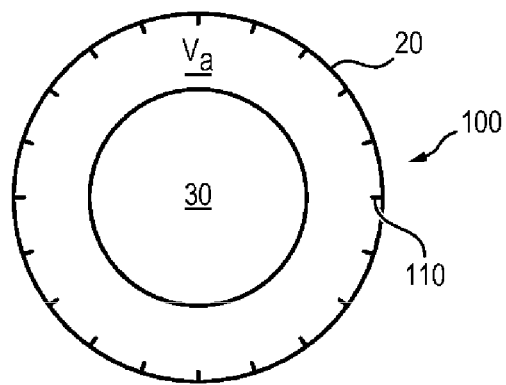
Figure 22B:
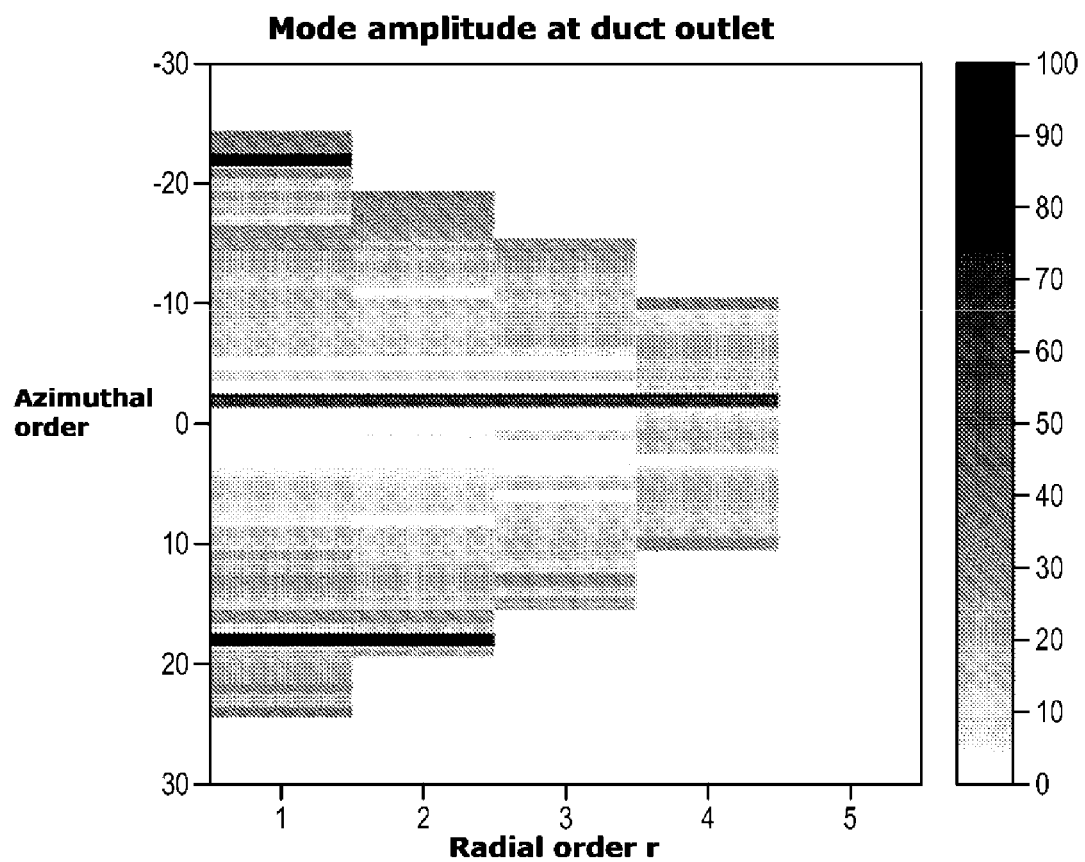
Figure 23A:
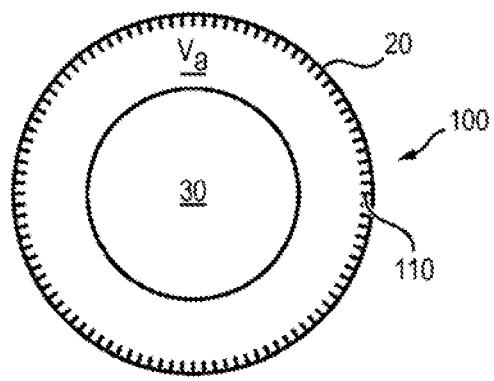
Figure 23B:
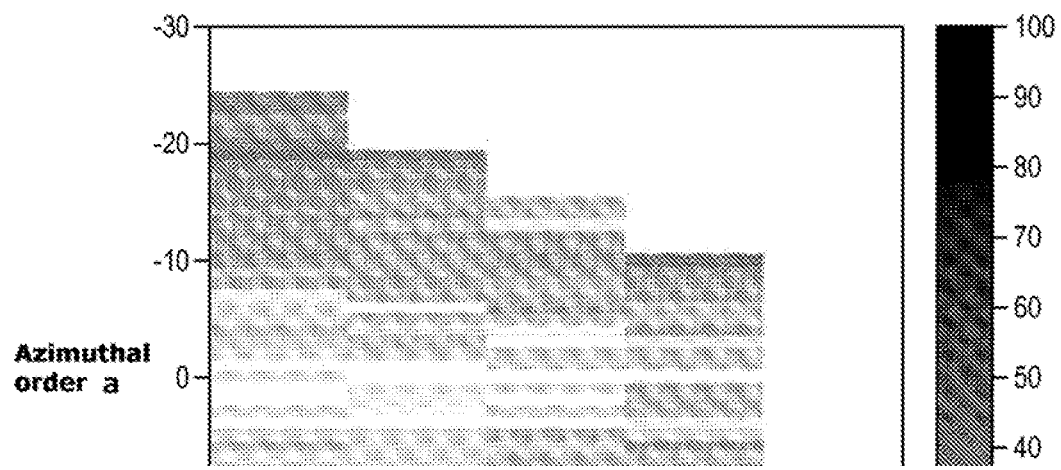

In this case, by passing through the SACOC, a portion of the acoustic energy will be deployed on other modes:

In FIGS. 22a and 22b, with twenty fins 110, the acoustic energy is deployed on the propagating modes a=18, a=−2 and a=−22, In FIGS. 23a and 23b, with a hundred fins 110, the acoustic energy e is deployed on the mode a=18 and a=82. The latter is evanescent, and therefore not propagating and the target frequency of 1200 Hz, it therefore does not appear in FIG. 23b.

The number of fins controls the modal content propagating in the air channel Va.

This reorganization satisfies the formulation of Tyler & Sofrin connecting the azimuthal order of the acoustic modes a with the geometric elements of the stator, in FIG. 23, the exchanger 100).

At the harmonic k of the blade passage frequency, the azimuthal orders generated take the form a=kB−sV, where B is the number of blades of the fan, B the number of stator elements and s any relative number.

The invention claimed is:

1. An assembly for a turbine engine, the assembly comprising:

a casing extending along a longitudinal axis of the turbine engine, a surface heat exchanger arranged on an inner edge of said casing and comprising a plurality of cooling fins extending radially inwards and longitudinally, and a central body partially concentrically arranged inside said casing, said casing and the central body defining between one another an annular air channel of which a width at a region of the surface heat exchanger is substantially constant, wherein the cooling fins are distributed over more than 180° of the inner edge of the casing, a mean height of the cooling fins being greater than 5% of the width of the annular air channel in the region of the heat exchanger and a height between cooling fins being variable as a function of an angular position of the cooling fins on the inner edge of the casing.

2. The assembly according to claim 1, wherein a distribution of the cooling fins on the inner edge of the casing is distributed discontinuously.

3. The assembly according to claim 1, wherein a height of the cooling fins depends on their angular position and satisfies a sinusoidal function.

4. An assembly for a turbine engine, the assembly comprising:

a casing extending along a longitudinal axis of the turbine engine, a surface heat exchanger arranged on an inner edge of said casing and comprising a plurality of cooling fins extending radially inwards and longitudinally, and a central body partially concentrically arranged inside said casing, said casing and the central body defining between one another an annular air channel of which a width at a region of the surface heat exchanger is substantially constant, wherein the cooling fins are distributed over more than 180° of the inner edge of the casing, a mean height of the cooling fins being greater than 5% of the width of the annular air channel in the region of the heat exchanger and a height between cooling fins being variable, wherein a height of the cooling fins depends on their angular position and satisfies a sinusoidal function, and wherein the height of the cooling fins is defined by an equation: $h(\theta)=h_0|\cos(n\cdot\theta)|$, with n a natural integer and $h_0$ is the height such that $h_0 \geq \pi/2 \times 0.05 \times h_{Va}$, $h_{Va}$ being the width of the air channel $V_a$.

5. The assembly according to claim 1, wherein the cooling fins are distributed over more than 270° of the inner edge of the casing.

6. The assembly according to claim 1, wherein a spacing between two cooling fins is less than 8.5 mm, so that the surface heat exchanger behaves acoustically like an expansion chamber for frequencies extending up to 10 kHz, at an ambient temperature of 20° C.

7. The assembly according to claim 1, wherein a spacing between two cooling fins is less than 4.3 mm, so that the surface heat exchanger behaves acoustically like an expansion chamber for frequencies extending up to 20 kHz, at an ambient temperature of 20° C.

8. The assembly according to claim 1, wherein a spacing between two cooling fins is determined at constant surface area depending on a surface area of a cooling fin and a total desired surface area of the cooling fins.

9. A turbine engine comprising an assembly according to claim 1.

* * * * *